United States Patent [19]
Toplis et al.

[11] 3,986,585
[45] Oct. 19, 1976

[54] BRAKE BLOCKS

[75] Inventors: John Geoffrey Toplis; John Barry Hufton, both of Nottingham, England

[73] Assignee: Raleigh Industries Limited, Nottingham, England

[22] Filed: Feb. 5, 1976

[21] Appl. No.: 655,397

Related U.S. Application Data

[63] Continuation of Ser. No. 515,584, Oct. 17, 1974, abandoned.

[52] U.S. Cl. .......................... 188/73.1; 188/250 B; 188/250 G
[51] Int. Cl.² ......................................... F16D 69/04
[58] Field of Search ........ 188/250 B, 250 G, 250 R, 188/73.1; 29/458; 264/263

[56] References Cited
UNITED STATES PATENTS

| | | | |
|---|---|---|---|
| 1,677,372 | 7/1928 | Ruhling | 188/250 R |
| 2,277,107 | 3/1942 | Imes | 188/250 R X |

FOREIGN PATENTS OR APPLICATIONS

| | | | |
|---|---|---|---|
| 23,869 | 12/1895 | United Kingdom | 188/250 R |
| 989,616 | 4/1965 | United Kingdom | 188/250 G |

Primary Examiner—George E. A. Halvosa
Attorney, Agent, or Firm—Lackenbach, Lilling & Siegel

[57] ABSTRACT

There is disclosed a brake block for a bicycle which comprises a block of friction material, an elongate rigid brake shoe element fixed to the block, the ends of the brake shoe element being surrounded by the friction material, and means for securing the block in a braking mechanism. Also disclosed are methods of making brake blocks for bicycles. One method comprises locating an elongate rigid brake shoe element in a mould, the shoe element having fixed thereto a stud for securing the block in a brake mechanism, moulding a block of friction material around the shoe element so that the end portions of the shoe element are surrounded by the friction material and removing the brake block so formed from the mould. Another method comprises coating a channel sectioned elongate rigid brake shoe element with a bonding medium, non-rotatably assembling a stud in said shoe element, locating the assembly in a mould, moulding a block of friction material around the shoe element so that the end portions of the shoe element are surrounded by the friction material, and removing the brake block so formed from the mould.

3 Claims, 6 Drawing Figures

BRAKE BLOCKS

This is a continuation of application Ser. No. 515,584, filed Oct. 17, 1974, now abandoned.

This invention concerns brake blocks for engaging a wheel rim for use in the braking mechanism of bicycles, tricycles, mopeds and the like (hereinafter referred to for simplicity as "bicycles"), and to methods of making such brake blocks.

In general the accepted form of brake block for bicycles is a block in the form of a piece of friction material adapted to be located (usually by sliding action) in a brake shoe which forms a part of the braking mechanism. One disadvantage of such a brake block and braking system lies in the fact that if the brake shoe is incorrectly positioned the act of applying the brakes may cause dislodgment of the brake block therefrom (unless of course the shoe is distorted to prevent this, with the consequent difficulty of replacement).

According to one aspect of the present invention a brake block for a bicycle comprises a block of friction material, an elongate rigid brake shoe element fixed to the block, the end portions of the brake shoe element being surrounded by the friction material, and means for securing the block in a braking mechanism.

According to another aspect of the present invention a method of making a brake block for a bicycle comprises locating an elongate rigid brake shoe element in a mould, the shoe element having fixed thereto a stud for securing the block in a brake mechanism, moulding a block of friction material around the shoe element so that the end portions of the shoe element are surrounded by the friction material and removing the brake block so formed from the mould.

According to a further aspect of the invention a method of making a brake block for a bicycle comprises coating a channel sectioned elongate rigid brake shoe element with a bonding medium, non-rotatably assembling a stud in said shoe element, locating the assembly in a mould, moulding a block of friction material around the shoe element so that the end portions of the shoe element are surrounded by the friction material, and removing the brake block so formed from the mould.

The invention may be performed in various ways and several specific embodiments will now be described by way of example with reference to the accompanying drawings, in which.

Figure 1:
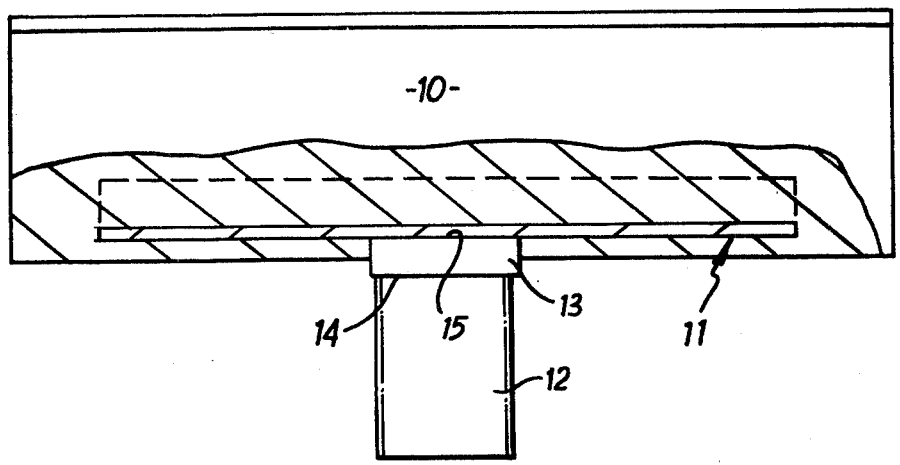
FIG. 1 is a part sectional side elevation of one form of brake block made in accordance with the invention.

It should be noted that the proportions of the parts of the brake blocks illustrated are not necessarily correct, and that some parts are shown larger than would be the case in a brake block when produced in order that they can be more clearly depicted. It is also pointed out that like parts of the various embodiments of the invention are given like reference numerals.

A brake block made in accordance with one form of the invention comprises a substantially rectangular section elongate block 10 of mouldable friction material (such as a rubber compound which has wear-resisting properties) into which is embedded a metallic or other comparably rigid brake shoe element 11 which extends over a substantial part of the length of the block 10. The element 11 is embedded in the block 10 by locating the element 11 in a mould and then moulding the block 10 around the element 11. To this shoe element 11 is firmly secured a cylindrical stud element 12 which may be screw threaded externally and which has its longitudinal axis at right angles to the longitudinal axis of the rigid shoe element 11. Preferably the stud 12 is located centrally of the shoe element 11 but in any event its disposition is such that its screw threaded part will extend from the block 10 of friction material when the latter is moulded. The end portions of the element 11 are surrounded by the friction material.

In order to ensure that a firm connection is made between the stud 12 and the shoe element 11 the former is conveniently provided, at its end adapted to abut the shoe element 11, with a shoe element receiving piece 13 which is either attached to or, more conveniently, formed integrally with the stud 12. The receiving piece 13 is so dimensioned as to have part of its surface projecting beyond the block 10 to produce a face 14 against which the part of the brake mechanism to which the block 10 is to be attached, in use, abuts. The shoe element 11 and the combined stud 12 and receiving piece 13 are fixed together rigidly prior to the moulding of the block 10, for example by welding the shoe element 11 to the receiving piece 13 and the assembly and the assembly consisting of the shoe element 11 and stud 12 with its receiving piece 13 may be considered to be a brake shoe.

The invention is not restricted to the details set out above. For example, the material of the block 10 may be a mouldable compound other than rubber providing its frictional and wearing properties are such as to make it suitable as a brake block.

Figure 2:
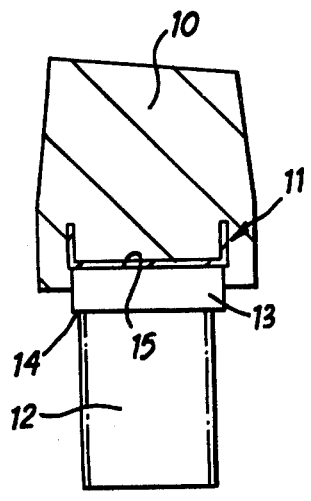
FIG. 2 is a part sectional end elevation of the brake block of FIG. 1.
Figure 3:
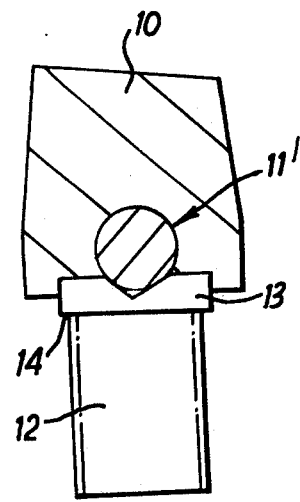
FIGS. 3 and 4 are views similar to FIG. 2 of modifications of the brake block.
Figure 4:
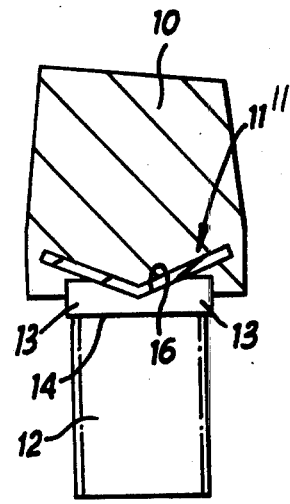

The shoe element 11' may be in the form of a rod of circular cross-section, as shown in FIG. 3, or material of channel section as shown in FIGS. 1 and 2 the shoe element 11" may be material in the form of a V section as shown in FIG. 4 or the shoe element may be of another form altogether, for example a simple flat plate (not shown) depending upon the external shape of the shoe element 11 the element receiving piece 13 may be formed with a flat surface 15 as shown in FIGS. 1 and 2 to which may be secured a flat or channel shaped element 11, or it may be provided with a V-groove 16 to which may be secured the V section shoe element 11 of FIG. 4 or the circular cross sectioned element 11 of FIG. 3 or it may be provided with any other shape of groove dependent upon the form of the element 11 which is to be used. Thus, in the constructions of FIGS. 1, 2 and 4 the piece 13 has a face all of which is in contact with the element 11. Alternatively of course the element receiving piece 13 may be dispensed with, providing the shoe element 11 is capable of being drilled and tapped to receive a screw thread formed on the stud 12. In such a construction the stud 12 is screw threaded over the whole of its length and after it has been screwed into the shoe element 11 it is secured against dislodgement by peening or otherwise distorting its end which passes through the shoe element 11 so that it is non-rotatably associated with the brake shoe element and so that it would firmly hold the block 10 and be capable of being firmly held in the brake mechanism.

While brake blocks made in accordance with any one of the forms illustrated in FIGS. 1 to 4 are found to be completely satisfactory for many uses it is appreciated that while the material of the block 10 completely embeds the shoe element 11 it may not in fact be bonded to it.

To apply bonding media to the shoe elements 11 referred to above, is however not competely desirable since each element is rigidly secured to the stud 12 and thus the risk of fouling the screw thread of the stud with bonding media exists and with it the attendant difficulty in fitting the brake block to the brake operating mechanism. If it is considered to be necessary, the assembled shoe element 11 and stud 12 may be coated with a bonding medium prior to moulding the block 10 around it.

Figure 5:
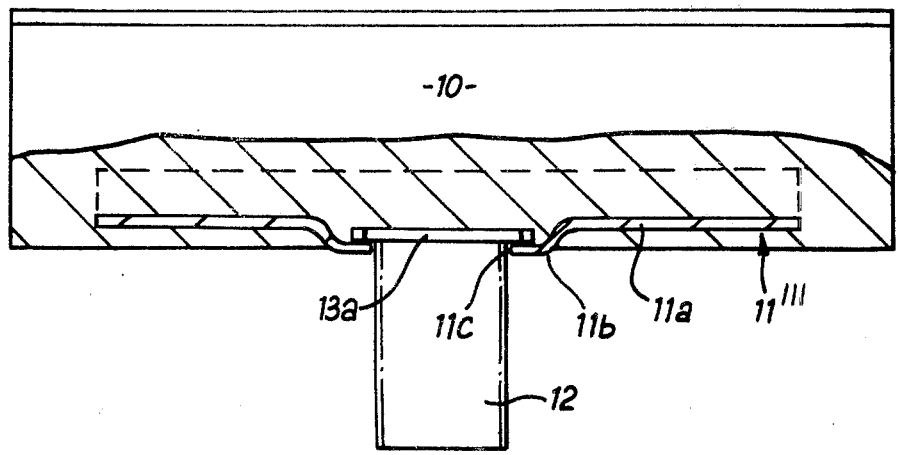
FIG. 5 is a view similar to FIG. 1 of a further modification of the brake block.
Figure 6:
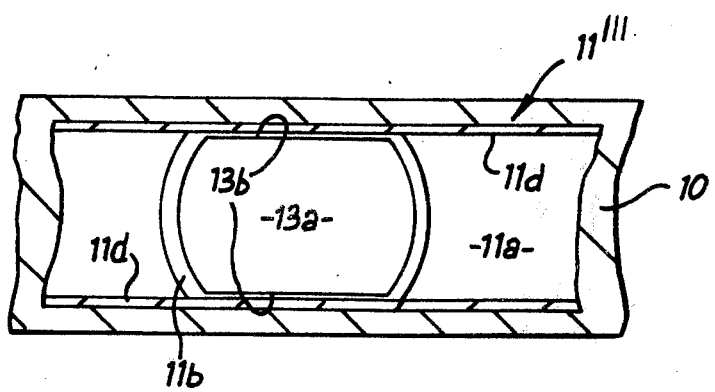
FIG. 6 is a part sectional plan view of the brake block of FIG. 5.

A further modification of the brake block is therefore provided which will enable the shoe element to be treated with a bonding medium to ensure that the block 10 when moulded becomes chemically bonded to the shoe element which is embedded in it. The modification is illustrated in FIGS. 5 and 6 from which it can be seen that there is provided a channel section shoe element 11''' having, in the central region of its base 11a a depression 11b in which is stamped or otherwise formed a hole 11c.

In this embodiment of the invention the stud 12 is provided with a capping piece 13a, preferably formed integrally with the stud 12. The capping piece is provided with opposed flats 13b and the dimension between the flats 13b is such that they will lie in close proximity with the inner faces 11d of the flanges of the channel section element 11 when the stud is passed through the hole 11c. The stud 12 is thus restrained against rotation relative to the shoe element 11.

With this construction it is possible completely to coat the shoe element 11''' with a bonding medium prior to assembly of the stud 12 with the element 11'''. The former is not secured to the shoe element 11''' but is held in the position shown in FIG. 5 during location of the element 11''' and stud 12 in a mould and subsequent moulding of the block 10 around the shoe element 11'''. Clearly when the block 10 is moulded the stud 12 is held in the position shown by the material of the block. The element 11''' is substantially completely embedded in the friction material.

Whilst reference has been made to the form of a single brake block it should be borne in mind that it is possible to mould a multiplicity of brake blocks simultaneously. In such a case a mould would be provided with a series of spaced apart brake shoes and the rubber or like material would be moulded as a single piece around all of the shoes. The moulding would, after removal from the mould, then require cutting to sever it into several individual blocks.

In addition to achieving the advantage that the block cannot be mounted in a manner such that it can be detached from the shoe by breaking action as a result of incorrect assembly in a braking mechanism further advantages are gained in that by producing the block and shoe as an integral unit at least one assembly operation during manufacture of the brake shoe unit is eliminated. Additionally, since an element of the brake shoe is embedded in the block, there is substantially no exposed metallic part and thus there is no deterioration in appearance of the bicycle due to the onset of corrosion.

What is claimed is:

1. A brake member for engaging the wheel rim of a bicycle, comprising: a generally T-shaped brake shoe having a straight rigid elongate cross-piece and having a rigid stem non-rotatably connected to said cross-piece and being adapted to secure the brake member in a braking mechanism; an elongate block of friction material molded around and bonded to said cross-piece so that substantially the entire cross-piece is securely embedded in and supports that part of said block nearer said stem; and wherein said stem comprises a generally cylindrical piece of metal, an external screw-thread extending from its free end over at least the greater part of its length, and a V-notch being provided across the surface of the other end thereof; and said cross-piece being in the form of a cylindrical metal rod lying at its central region in said V-notch of said other end of said stem, and being welded thereat to said stem, whereby the remainder and greater part of said block is available for use as a brake block by repeated application of the face thereof remote from said stem to said wheel rim.

2. A brake member as set forth in claim 1 in which said cross-piece and said stem are integral.

3. A brake member for engaging the wheel rim of a bicycle, comprising: a generally T-shaped brake shoe having a straight rigid elongate cross-piece and a rigid stem non-rotatably connected thereto to form a unitary one-piece assembly, and being adapted to secure the brake member in a braking mechanism; an elongate block of friction material molded around and bonded to said cross-piece so that substantially the entire cross-piece is securely embedded in and supports that part of said block nearer said stem; and wherein said stem comprises a generally cylindrical piece of metal, an external screw-thread extending from its free end over at least the greater part of its length, and a V- notch being provided across the surface of the other end thereof; and said cross-piece being in the form of a cylindrical metal rod lying at its central region in said V-notch of said other end of said stem, and being welded thereat to said stem, whereby the remainder and greater part of said block is available for use as a brake block by repeated application of the face thereof remote from said stem to said wheel rim.

* * * * *